US009991806B2

(12) United States Patent
Gong

(10) Patent No.: US 9,991,806 B2
(45) Date of Patent: Jun. 5, 2018

(54) VOLTAGE CONVERTER CIRCUITRY AND METHODS IMPLEMENTING MODULATED FEEDBACK SIGNAL

(71) Applicant: Infineon Technologies Austria AG, Villach (AT)

(72) Inventor: Xiao Wu Gong, Choa Chu Kang (SG)

(73) Assignee: Infineon Technologies Austria AG, Villach (AT)

( * ) Notice: Subject to any disclaimer, the term of this patent is extended or adjusted under 35 U.S.C. 154(b) by 0 days. days.

(21) Appl. No.: 15/246,236

(22) Filed: Aug. 24, 2016

(65) Prior Publication Data

US 2017/0063243 A1 Mar. 2, 2017

(30) Foreign Application Priority Data

Aug. 31, 2015 (DE) ......................... 10 2015 114 495

(51) Int. Cl.
*H02M 3/335* (2006.01)
*H02M 1/00* (2006.01)

(52) U.S. Cl.
CPC ... *H02M 3/33523* (2013.01); *H02M 3/33507* (2013.01); *H02M 2001/0009* (2013.01)

(58) Field of Classification Search
CPC .......................................... H02M 3/335–3/42
See application file for complete search history.

(56) References Cited

U.S. PATENT DOCUMENTS

| 2006/0018136 A1* | 1/2006 | Takahashi ......... H02M 3/33523 363/21.15 |
| 2007/0030715 A1 | 2/2007 | Mihai-Costin |
| 2014/0036550 A1 | 2/2014 | Ru-Shiaun et al. |
| 2015/0229149 A1 | 8/2015 | Fahlenkamp |
| 2016/0036339 A1* | 2/2016 | Kikuchi ............. H02M 3/33592 363/21.14 |
| 2016/0094062 A1* | 3/2016 | Osswald ........... H02M 3/33561 320/112 |

FOREIGN PATENT DOCUMENTS

| DE | 10 215 101 525 A1 | 8/2015 |
| JP | 2004 282 944 A | 7/2004 |

* cited by examiner

*Primary Examiner* — Gary L Laxton
*Assistant Examiner* — Peter Novak
(74) *Attorney, Agent, or Firm* — Chapin IP Law, LLC

(57) ABSTRACT

Disclosed is a voltage converter and a method. The voltage converter includes: an input, an output, and a transformer including a primary winding and a secondary winding; a primary side circuit comprising at least one switch and coupled between the input and the primary winding; a secondary side control circuit coupled to the output. The primary side circuit is configured to receive a feedback signal from the secondary side control circuit. The secondary side control circuit is configured to generate an error signal based on an output signal of the voltage converter, and to modulate the error signal based on supplemental information to generate the feedback signal.

15 Claims, 5 Drawing Sheets

VOLTAGE CONVERTER CIRCUITRY AND METHODS IMPLEMENTING MODULATED FEEDBACK SIGNAL

RELATED APPLICATIONS

This application is related to and claims priority to earlier filed German Patent Application Serial Number 10 2015 114 495.6 entitled "VOLTAGE CONVERTER AND VOLTAGE CONVERSION METHOD," (German Attorney Docket No. IFV372DE), filed on Aug. 31, 2015, the entire teachings of which are incorporated herein by this reference.

FIELD OF THE DISCLOSURE

The present disclosure relates to a voltage converter and a voltage conversion method.

BACKGROUND

Switched mode voltage converters (switched mode power supplies, SMPS) are widely used for power conversion in automotive, industrial, or consumer electronic applications. Some types of switched mode voltage converters, such as a flyback converter, includes a transformer that forms a potential barrier between an input and an output of the switched mode voltage converter. In these types of switched mode voltage converters an input voltage and input current is received by a primary side circuit connected to a primary winding of the transformer, and an output signal (an output voltage or an output current) is output by a circuit connected to a secondary side of the transformer. In secondary side controlled voltage converters a feedback signal representing one of the output voltage and the output current is transmitted from the secondary side circuit to the primary side circuit. Due to the potential barrier such transmission requires the use of circuits, such as opto-couplers, capable of transmitting the feedback signal via the potential barrier.

SUMMARY OF THE DISCLOSURE

This disclosure includes the observation that there is a need to transmit additional information from the secondary side circuit to the primary side circuit at low cost.

One example embodiment relates to a voltage converter. The voltage converter includes an input, an output, and a transformer with a primary winding and a secondary winding. A primary side circuit including switch circuitry including at least one switch is coupled between the input (input voltage node that receives input voltage Vin) and the primary winding, a rectifier circuit is coupled between the secondary winding and the output (output voltage node that outputs Vout), and a secondary side control circuit is coupled to the output. The primary side circuit is configured to receive a feedback signal from the secondary side control circuit. The secondary side control circuit is configured to generate an error signal based on an output signal of the voltage converter, and to modulate the error signal based on supplemental information (supplemental data) to generate the feedback signal.

One example embodiment relates to a method. The method includes, via a secondary side control circuit in a voltage converter, generating an error signal based on an output signal of the voltage converter, and modulating the error signal based on supplemental information (supplemental data) to generate a feedback signal. The method further includes receiving the feedback signal by a primary side circuit including at least one switch and coupled to a primary winding of a transformer in the voltage converter.

These and other more specific embodiments are disclosed in more detail below.

Note that any of the resources as discussed herein can include one or more computerized devices, medical devices, mobile devices, servers, base stations, wireless playback equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium or hardware storage media disparately or co-located) on which software instructions are encoded for subsequent execution. The instructions, when executed in a computerized device (hardware) having a processor, program and/or cause the processor (hardware) to perform any of the operations disclosed herein. Such arrangements are typically provided as software, code, instructions, and/or other data (e.g., data structures) arranged or encoded on a non-transitory computer readable storage media such as an optical medium (e.g., CD-ROM), floppy disk, hard disk, memory stick, memory device, etc., or other a medium such as firmware in one or more ROM, RAM, PROM, etc., and/or as an Application Specific Integrated Circuit (ASIC), etc. The software or firmware or other such configurations can be installed onto a computerized device to cause the computerized device to perform any operations explained herein.

Accordingly, embodiments herein are directed to methods, apparatuses, computer program products, computer-readable media, etc., that support operations as discussed herein.

One embodiment includes a computer readable storage media and/or a apparatus having instructions stored thereon to facilitate generation of an output voltage. For example, in one embodiment, the instructions, when executed by computer processor hardware, cause the computer processor hardware (such as one or more processor devices) to: via a secondary side control circuit in a voltage converter, generate an error signal based on an output signal of the voltage converter and supplemental data received at an information input (such as one or more nodes, a port, etc., of or associated with the secondary side control circuit), and modulate the error signal based on the supplemental data to generate a feedback signal, and receive the feedback signal by a primary side circuit comprising switch circuitry including at least one switch and coupled to a primary winding of a transformer in the voltage converter.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the apparatus, method, system, instructions on computer readable storage media, etc., as discussed herein also can be embodied strictly as a software program, firmware, as a hybrid of software, hardware and/or firmware, or as hardware alone such as within a processor (hardware or software), or within an operating apparatus or a within a software application.

As discussed herein, techniques herein are well suited for use in the field of voltage converters and power supplies. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

DETAILED DESCRIPTION

In the following detailed description, reference is made to the accompanying drawings. The drawings form a part of the description and by way of illustration show specific examples in which the invention may be practised. It is to be understood that the features of the various examples described herein may be combined with each other, unless specifically noted otherwise.

Figure 1:
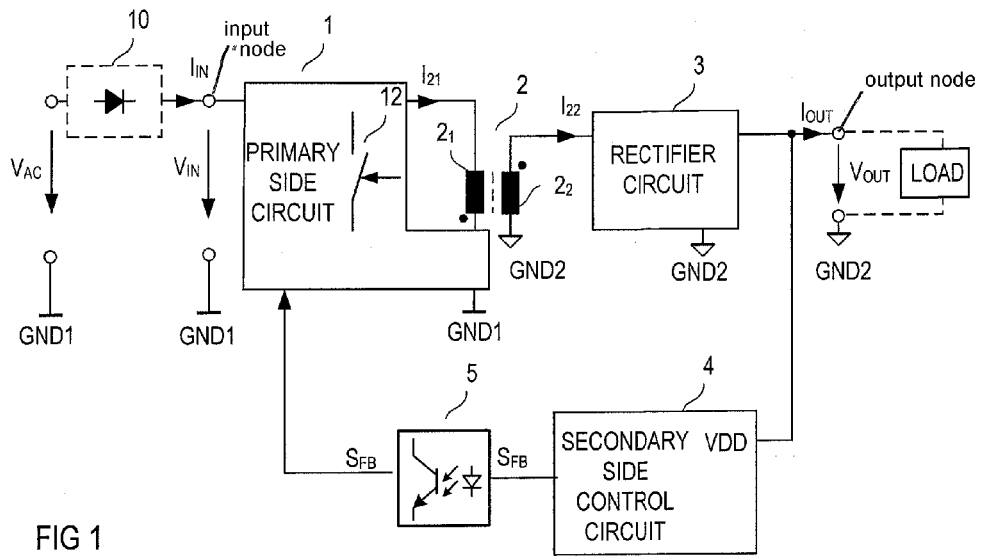
FIG. 1 shows an example voltage converter including a primary side circuit, a rectifier circuit, and a secondary side control circuit according to embodiments herein.

FIG. 1 shows a voltage converter (switched mode power supply, SMPS) according to one example. The voltage converter includes an input with a first input voltage node configured to receive an input voltage $V_{IN}$ and/or an input current $I_{IN}$, and an output with an output voltage node to output an output voltage $V_{OUT}$ and/or an output current $I_{OUT}$. A load Z (illustrated in dashed lines in FIG. 1) may receive and be powered by the output voltage $V_{OUT}$ and the output current $I_{OUT}$. The voltage converter further includes a transformer 2 with a primary winding $2_1$ and a secondary winding $2_2$ magnetically coupled with the primary winding $2_1$. A primary side circuit 1 is coupled between the input and the primary winding $2_1$, and a rectifier circuit 3 is coupled between the secondary winding $2_2$ and the output. The primary side circuit 1 includes at least one switch 12. According to one example, the primary side circuit 1 is configured, by operating the at least one switch 12, to transmit electrical power in a pulsed fashion via the transformer 2 to the rectifier circuit 3, whereas the rectifier circuit 3 generates the output voltage $V_{OUT}$ and the output current $I_{OUT}$ from the pulsed power received via the transformer 2. According to one example, the output current $I_{OUT}$ is a direct current (a.k.a., a DC current) and the output voltage $V_{OUT}$ is a direct voltage (DC voltage).

The voltage converter is configured to regulate one of the output voltage $V_{OUT}$ and the output current $I_{OUT}$. The parameter regulated by the voltage converter is referred to as output signal in the following. Just for the purpose of explanation it is assumed that the voltage converter is configured to regulate the output voltage $V_{OUT}$. For this, a secondary side control circuit 4 receives the output voltage $V_{OUT}$, or a signal representing the output voltage $V_{OUT}$, and generates a feedback signal $S_{FB}$ based on the output voltage $V_{OUT}$. The primary side circuit 1 is configured to receive the feedback signal $S_{FB}$ and to control the power transmitted via the transformer 2 from the primary side of the voltage converter to the secondary side of the voltage converter based on this feedback signal $S_{FB}$. By virtue of the transformer 2 there is a potential barrier between the primary side and the secondary side of the voltage converter, that is, between the input and the output of the voltage converter. The voltage converter includes a transmission circuit 5 that is configured to transmit the feedback signal $S_{FB}$ from the secondary side control circuit 4 to the primary side circuit 1 across this potential voltage barrier. That is, reference ground GND1 can be substantially different than reference ground GND2. According to one example, the transmission circuit 5 includes an opto-coupler. However, using an opto-coupler to transmit the feedback signal $S_{FB}$ across the potential barrier is only an example. Any other type of transmission circuit suitable to transmit a signal across a potential barrier may be used as well. One type of such other transmission circuit is a transmission circuit including a transformer.

The transmission circuit 5 does not change the characteristic of the feedback signal $S_{FB}$. In particular, the feedback signal output by the transmission circuit 5 to the primary side circuit 1 can be substantially proportional to the signal received by the transmission circuit 5 from the secondary side control circuit 4. Thus, in the following, the term "feedback signal $S_{FB}$" will be used for both, the signal output by the secondary side control circuit 4 and the signal received by the primary side circuit 1, although these signals are referenced to different ground potentials. The feedback signal $S_{FB}$ output by the secondary side control circuit 4 is referenced to the secondary side ground node GND2, while the feedback signal $S_{FB}$ output by the transmission circuit 5 and received by the primary side circuit 1 is referenced to the primary side ground node GND1.

According to one example, the secondary side control circuit 4 is configured to generate an error signal based on the output signal $V_{OUT}$ and to modulate the error signal based on supplemental information to generate the feedback signal $S_{FB}$. Through this, the feedback signal $S_{FB}$ carries two types of information, namely the information included in the error signal and the supplemental information (supplemental data received by the secondary side control circuit 4 from an external source with respect to the secondary side control circuit 4 or supplemental data generated by the secondary side control circuit 4). Both of these types of information included in the feedback signal $S_{FB}$ are transmitted via the transmission circuit 5 in feedback signal $S_{FB}$ across the voltage potential barrier from the secondary side control circuit 4 to the primary side circuit 1. Thus, only one transmission circuit 5 is required, which helps to save costs. Details on generating the error signal are explained further below.

Figure 2A:
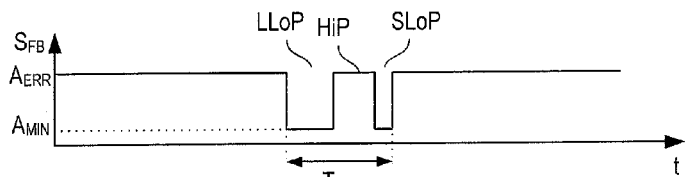
FIGS. 2A-2B show signal waveforms that illustrate different examples for transmitting an output signal information and additional information from a secondary side to a primary side of a voltage converter according to embodiments herein.
Figure 2B:
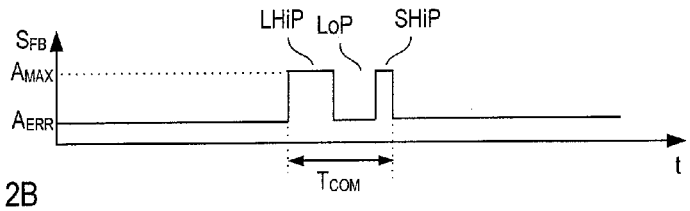

FIGS. 2A and 2B show two different examples of how the feedback signal $S_{FB}$ may carry the error signal information and the supplemental information. Each of FIGS. 2A and 2B shows one example of a signal waveform of the feedback signal $S_{FB}$. In order to transmit the supplemental information, there is a time period (time window) $T_{COM}$ in which the supplemental information is transmitted. Outside this time window $T_{COM}$, the feedback signal $S_{FB}$ has a signal level (amplitude) $A_{ERR}$ defined by the error signal. In the example shown in FIG. 2A, the supplemental information is transmitted in the communication window $T_{COM}$ by modulating the error signal such that it is pulled down in accordance with a predefined pattern from the amplitude $A_{ERR}$ defined by the error signal $S_{ERR}$. In this example, this pattern includes two low pulses separated by a high pulse. The low pulses may have different durations. In the example shown in FIG. 2A, there is a long low pulse (LLoP), a short low pulse (SLoP), and a high pulse (HiP) that separates the low pulses. During the high pulse, the level of the feedback signal $S_{FB}$ corresponds to the level $A_{ERR}$ defined by the error signal.

In the example shown in FIG. 2B, the supplemental information is transmitted by modulating the error signal such that the signal level is pulled up in accordance with a predefined pattern from the level $A_{ERR}$ defined by the error signal SERB to a maximum level $A_{MAX}$. In this example, the predefined pattern includes two high pulses separated by a low pulse. The high pulses may have different durations. In this example, there is a long high pulse (LHiP), a short high pulse (SHiP) and a low pulse (LoP) that separates the high pulses. During the low pulse (LoP), the feedback signal $S_{FB}$ has a signal level as defined by the error signal. In one embodiment, the high pulses and low pulses represent information such as data bits or groups of data bits conveyed in the feedback signal.

Figure 3A:
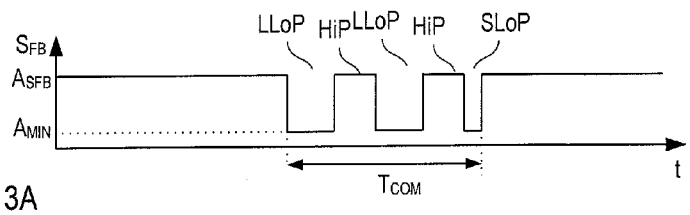
FIGS. 3A-3B show signal waveforms that illustrate further examples for transmitting an output signal information and additional information from the secondary side to the primary side of a voltage converter according to embodiments herein.
Figure 3B:
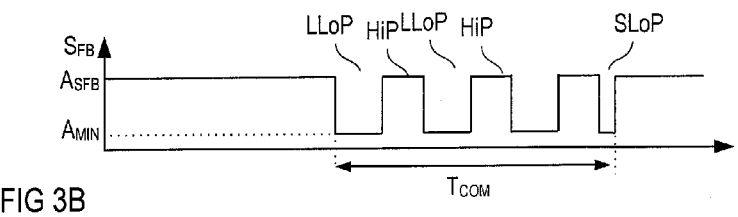

The modulation scheme shown in FIGS. 2A and 2B for transmitting the supplemental information in the communication window $T_{COM}$ is similar to a pulse code modulation (PCM). A plurality of different pulse sequences or signal patterns can be generated in the communication window $T_{COM}$, whereas each of these patterns is associated with one specific supplemental information. Thus, different information can be transmitted in the communication window $T_{COM}$. Examples of how different pulse sequences (signal patterns) may look like are illustrated in FIGS. 3A and 3B. These figures show waveform diagrams of a feedback signal $S_{FB}$ modulated in accordance with the modulation scheme explained with reference to FIG. 2A. Referring to these Figures, different pulse sequences can be generated by varying the number of long low pulses (LLoP). FIG. 3A shows an example of a pulse sequence with two long low pulses (LLoP), and FIG. 3B shows an example with three long low pulses (LLoP). In each case, there is one short low pulse (SLoP) that terminates the respective pulse sequence. It should be noted that varying the number of certain pulses, such as the long low pulses (LLoP) in the examples shown in FIGS. 3A and 3B, is only one example of how different information can be mapped to the pulse sequence. According to another example, the duration of one or more pulses of the pulse sequence can be varied in order to map different information to the pulse sequence. According to yet another example, the amplitude of at least one pulse of the pulse sequence can be varied in order to map different information to the pulse sequence.

Figure 4:
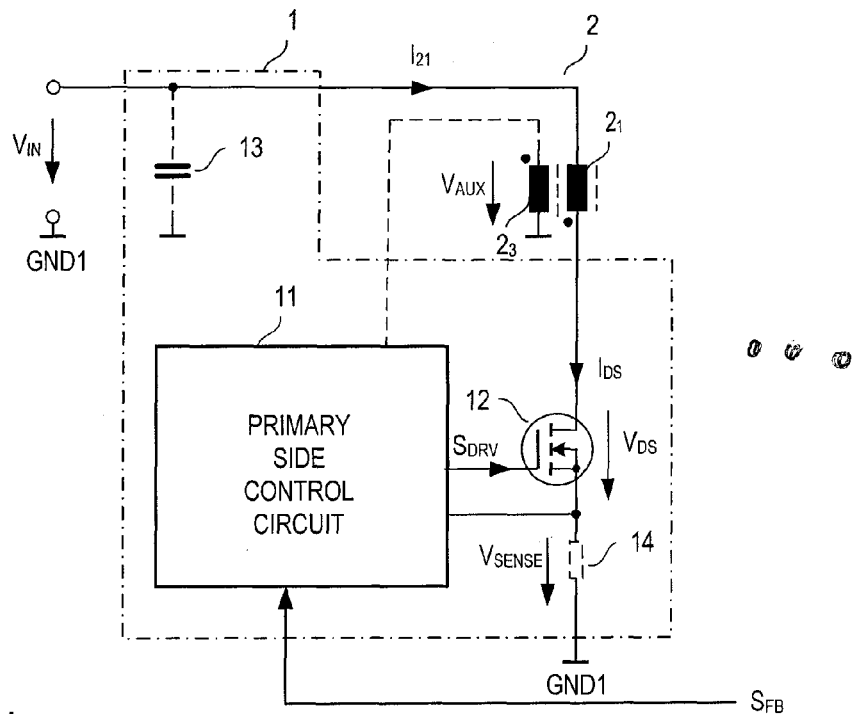
FIG. 4 shows one example of a primary side circuit according to embodiments herein.

The method of transmitting error signal information and supplemental information by using only one feedback signal $S_{FB}$ explained above can be used in each type of power converter that includes a transformer. One type of power converter that includes a transformer as a potential barrier between the input (input voltage node) and the output (output voltage node) of the power converter is a flyback converter. FIG. 4 shows one example of a primary side circuit 1 in a flyback converter. In this converter, the primary side circuit 1 includes a switch 12 connected in series with the primary winding $2_1$ of the transformer 2. The series circuit with the primary winding $2_1$ and the switch 12 is connected between the input nodes of the power converter. A primary side control circuit 11 receives the feedback signal $S_{FB}$ and is configured to drive the switch 12 based on the feedback signal $S_{FB}$. For driving the switch 12, the primary side control circuit 11 generates a drive signal $S_{DRV}$ based on the feedback signal $S_{FB}$. The switch 12 receives the drive signal $S_{DRV}$ and switches on and off based on the drive signal $S_{DRV}$. According to one example, the drive signal $S_{DRV}$ is a pulse-width modulated (PWM) drive signal.

In the example shown in FIG. 4, the switch 12 is a MOSFET, in particular an n-type enhancement MOSFET. However, this is only an example. Any other type of transistor device, such as a p-type enhancement MOSFET, a depletion MOSFET, a JFET (Junction Field-Effect Transistor), an IGBT (Insulated Gate Bipolar Transistor), a Bipolar Junction Transistor (BJT), or a HEMT (High Electron-Mobility Transistor) can be used as well.

Optionally, a current sense resistor 14 is connected in series with the primary winding $2_1$ and the electronic switch 12. The current sense transistor generates a sense voltage $V_{SENSE}$ that represents a current IDs through the electronic switch 12 and the primary winding $2_1$, respectively. The primary side circuit control circuit 11 receives this sense voltage $V_{SENSE}$. Furthermore, an input capacitor 13 may be connected between the input nodes. This input capacitor 13 filters ripples that may occur in the input voltage $V_{IN}$.

Figure 5:
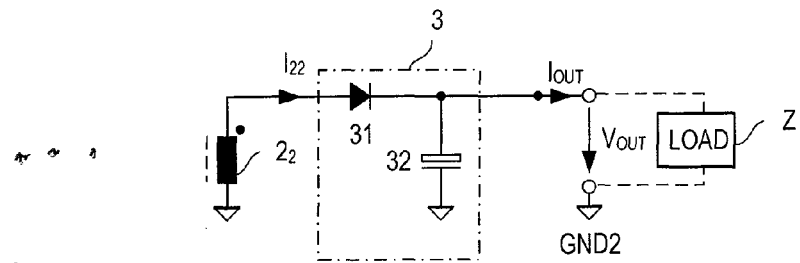
FIG. 5 shows one example of a rectifier circuit according to embodiments herein.

FIG. 5 shows one example of the secondary side rectifier circuit 3. In this example, the rectifier circuit 3 includes a rectifier element 31, such as a diode, and a capacitor 32. The rectifier element 31 and the capacitor 32 are connected in series, whereas the series circuit with the rectifier element 31 and the capacitor 32 is connected in parallel with the secondary winding $2_2$. The output voltage $V_{OUT}$ is available across the capacitor 32 of the rectifier circuit 3. In the flyback converter, the primary winding $2_1$ and the secondary winding $2_2$ have opposite winding senses. By this, a current can flow only through one of the primary winding $2_1$ and the secondary winding $2_2$ at one time.

Referring to the above, the feedback signal $S_{FB}$ includes an error signal that is based on the output signal $V_{OUT}$, and the feedback signal includes additional information transmitted by modulating the error signal. Examples of how to retrieve the error signal and the supplemental information from the feedback signal $S_{FB}$ in the primary side control circuit 11 are explained herein below. Based on the error signal retrieved from the feedback signal $S_{FB}$, the primary side control circuit 11 can operate the switch 12 in a conventional way. Examples for operating the primary side circuit 1, in particular, for driving the electronic switch 12 by the primary side control circuit 11, are explained with reference to FIGS. 6A-6B below.

Figure 6A:
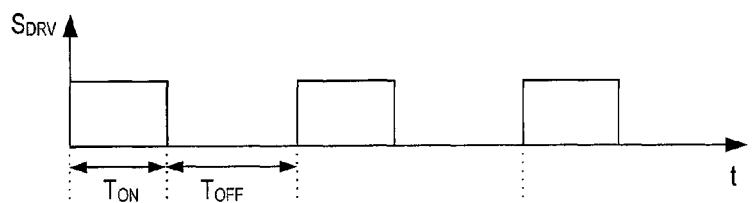
FIGS. 6A-6B show signal waveforms that illustrate one way of operation of the primary side circuit according to embodiments herein.

FIG. 6A shows one example of a signal waveform of the drive signal $S_{DRV}$ generated by the primary side control circuit 11 based on the error signal retrieved from the feedback signal $S_{FB}$. Referring to FIG. 6A, driving the electronic switch 12 by the drive signal $S_{DRV}$ includes driving the electronic switch 12 in a plurality of successive drive cycles. In each drive cycle, the electronic switch 12 is switched on for a first time $T_{ON}$ and switched off for a second time $T_{OFF}$. In the following, the first time $T_{ON}$ will be referred to as on-time and the second time $T_{OFF}$ will be referred to as off-time. A signal level of the drive signal $S_{DRV}$ that switches on the electronic switch 12 will be referred to as on-level in the following, and a signal level that switches off the electronic switch 12 will be referred to as off-level in the following. Just for the purpose of illustration, the on-level is a high signal level in the waveform diagram shown in FIG. 6A, and the off-level is a low signal level. According to one example, the primary side control circuit 11 generates the drive signal $S_{DRV}$ such that the on-time $T_{ON}$ is dependent on the signal level $A_{ERR}$ of the error signal. According to one example, the on-time increases as the signal level $A_{ERR}$ increases, and vice versa.

Figure 6B:
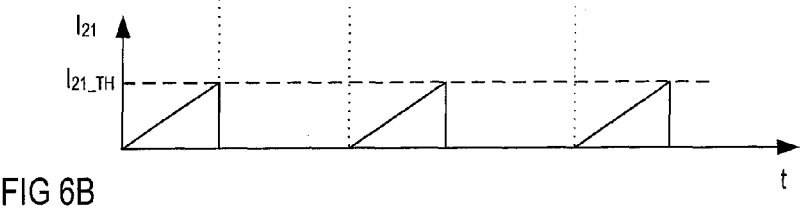

FIG. 6B shows a waveform diagram of a current (primary current) $I_{21}$ through the primary winding $2_1$. Referring to FIG. 6B, a current level of this current $I_{21}$ increases during the on-time. The current $I_{21}$ flowing through the primary winding $2_1$ is associated with electrical energy stored in the transformer 2, more specifically, electrical energy stored in an airgap (not shown) of the transformer 2. At the end of the on-time $T_{ON}$, the electronic switch 12 switches off, the primary current $I_{21}$ drops to zero and the energy stored in the transformer 2 is transferred via the secondary winding $2_2$ to the rectifier circuit 3 and the load Z, respectively. Storing the energy in the transformer 2 during the on-time is associated with magnetizing the transformer 2, and transferring the energy to the secondary side associated with demagnetizing the transformer 2 during the off-time.

According to one example, a duration of the off-time $T_{OFF}$ is chosen such that the transformer 2 completely demagnetizes during the off-time $T_{OFF}$ and is demagnetized for a while before the electronic switch 12 again switches on. In this case, the primary current $I_{21}$ is zero at the beginning of each on-time $T_{ON}$ and then increases. This is illustrated in FIG. 6B and is known as discontinuous conduction mode (DCM). However, operating the power converter in DCM is only an example. It is also possible to operate the power converter in a continuous conduction mode (CCM) in which the transformer 2 does not completely demagnetize during the off-time $T_{OFF}$ so that the primary current $I_{21}$ at the beginning of each on-time $T_{ON}$ does not start to increase from zero.

The primary side control circuit 11 may be configured to operate the electronic switch 12 in a fixed frequency mode. In this operation mode, the electronic switch 12 is switched on at a fixed frequency f. A duration $T_{CYCLE}$ of the individual drive cycles is equal, whereas $T_{CYCLE}=1/f$.

According to another example, the primary side control circuit operates the electronic switch 12 in a quasi-resonant mode. In this operation mode, the primary side control circuit 11 senses a magnetization of the transformer 12 and switches on the electronic switch 12 immediately after the transformer 2 has been demagnetized. Referring to FIG. 4, an auxiliary winding 23 magnetically coupled with the primary winding $2_1$ may be used by the primary side control circuit 11 to detect the magnetization state of the transformer 2. Operating a flyback converter in a quasi-resonant mode is commonly known, so that no further explanations are required in this regard.

In each of the fixed-frequency mode and the quasi-resonant mode, the primary side control circuit 11 varies the on-time $T_{ON}$ based on the retrieved error signal in order to regulate the output signal $V_{OUT}$. According to one example, the primary side control circuit 11 sets the on-time $T_{ON}$ in the individual drive cycles only based on the signal level $A_{ERR}$ of the retrieved error signal. This operation mode can be referred to as voltage mode.

According to another example, the primary side control circuit 11 generates a threshold signal $I_{21\_TH}$ based on the amplitude of the retrieved error signal, detects the primary current $I_{21}$ during the on-time $T_{ON}$ and switches off the electronic switch 12 when the primary current $I_{21}$ reaches the generated threshold signal $I_{21\_TH}$. This is schematically illustrated in FIG. 6B and can be referred to as current mode. The current sense signal $V_{SENSE}$ the primary side control 11 circuit receives from the sense resistor 14 represents the primary current $I_{21}$. For example, the current threshold signal $I_{21\_TH}$ is the retrieved error signal or a signal proportional to the retrieved error signal.

Figure 7:
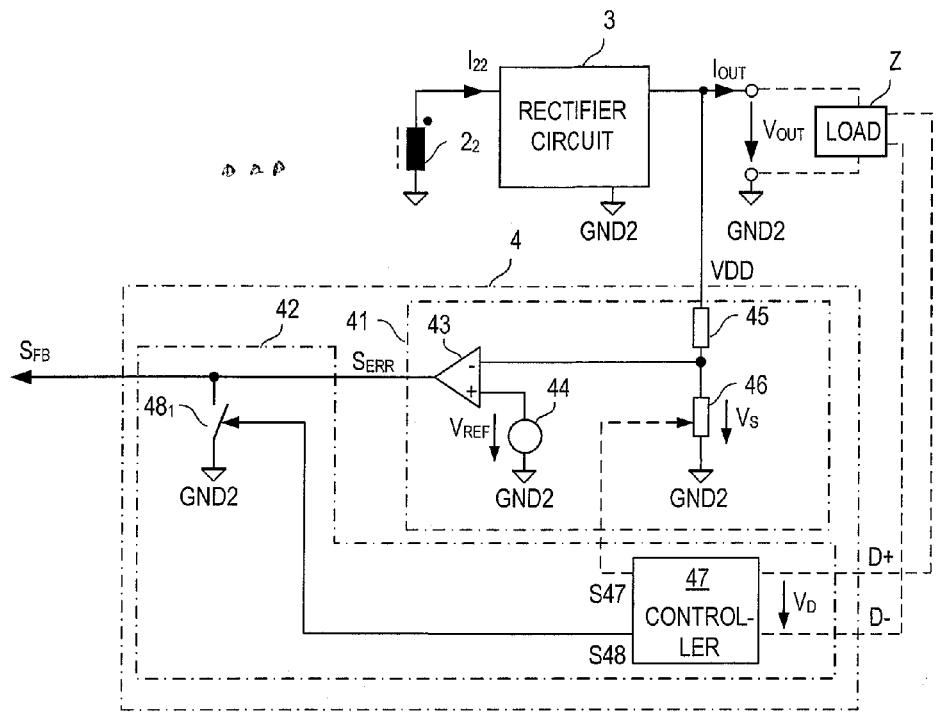
FIG. 7 shows one example of a secondary side control circuit according to embodiments herein.

FIG. 7 shows one example of the secondary side control circuit 4. This secondary side control circuit 4 includes an error signal generator 41 that receives the output signal $V_{OUT}$ at a first input VDD. The error signal generator is configured to generate the error signal $S_{ERR}$ based on the output voltage $V_{OUT}$ and a reference voltage $V_{REF}$. In the example shown in FIG. 7, a voltage divider with a first resistor 45 and a second resistor 46 receives the output voltage $V_{OUT}$ and provides a sense voltage $V_S$ that is proportional to the output voltage $V_{OUT}$. An error filter 43 receives the sense voltage $V_S$ at a first input and the reference voltage $V_{REF}$ at a second input. The reference voltage $V_{REF}$ is provided by a reference voltage generator 44. The error filter 43 is configured to generate the error signal $S_{ERR}$ based on a difference $V_{REF}-V_S$ between the reference voltage $V_{REF}$ and the sense voltage $V_S$. The error filter 43 may have one of a proportional (P) characteristic, an integral (I) characteristic or a proportional-integral (PI) characteristic.

The secondary side control circuit 4 further include a modulation circuit 42 that receives the error signal $S_{ERR}$ and outputs the feedback signal $S_{FB}$. The modulation circuit 42 is configured to modulate the error signal $S_{ERR}$ in order to provide the feedback signal $S_{FB}$. According to one example, the modulation circuit 42 includes a first switch $48_1$ coupled between the output of the error signal generator 41 and the secondary side ground node GND2. A controller 47 is configured to drive the first electronic switch $48_1$ in order to modulate the error signal $S_{ERR}$.

According to one example, the power converter is configured to regulate the output voltage $V_{OUT}$ such that a voltage level of the output voltage $V_{OUT}$ is dependent on a voltage information received by the secondary side control circuit 4 at input nodes D+, D−. This voltage information may be received from the load Z coupled to the output of the power converter. In this example, the power converter may support loads that have a QuickCharge™ capability. Loads having such QuickCharge™ capability are configured to inform the power converter which output voltage level they would like to receive. According to one example, the power converter is configured to generate three different output voltage levels, namely 5V, 9V, and 12V dependent on the voltage information received at the input D+, D−. According to one example, the voltage information is represented by a voltage $V_D$ between the input nodes D+, D−.

According to one example, the controller 47 is configured to sense the voltage $V_D$ in order to obtain the voltage information and to modulate the error signal $S_{ERR}$ based on this voltage information. In this case, the voltage information $V_D$ is the supplemental information transmitted from the secondary side to the primary side of the controller. The modulation circuit 42 shown in FIG. 7 is configured to modulate the error signal as shown in FIGS. 2A and 3A-3B. In this example, the minimum level $A_{MIN}$ is represented by the secondary side ground level GND2. How the supplemental information is processed in the primary side control circuit 11 and how this supplemental information may influence operation of the primary side control circuit 11 is explained in further detail below.

The voltage level of the output voltage $V_{OUT}$ can be varied by varying the resistance of the second resistor 46 in the voltage divider 45, 46. According to one example, this resistor 46 is a variable resistor and the controller 47 is configured to vary the resistance of this resistor 46 based on the voltage information $V_D$ received at the input D+, D−. This is explained in the following. Basically, the power converter based on the error signal $S_{ERR}$ regulates the output voltage $V_{OUT}$ such that the sense voltage $V_S$ equals the reference voltage $V_{REF}$ so that the error is zero. That is, $$V_S = V_{REF} \quad (1).$$

The sense voltage $V_S$ can be expressed as $$V_S = V_{OUT} \cdot \frac{R46}{R45 + R46}, \quad (2)$$

and based on equations (1) and (2), the output voltage $V_{OUT}$ can be expressed as $$V_{OUT} = V_{REF} \cdot \frac{R45 + R46}{R46} = V_{REF}\left(1 + \frac{R45}{R46}\right), \quad (3)$$

where R45 is the resistance of the first resistor 45 and R46 is the resistance of the second resistor 46. Thus, by varying the resistance R46 of the resistor 46, the voltage level of the output voltage $V_{OUT}$ can be adjusted. Generally, the output voltage $V_{OUT}$ level increases as the resistance R46 decreases, and vice versa.

Figure 8:
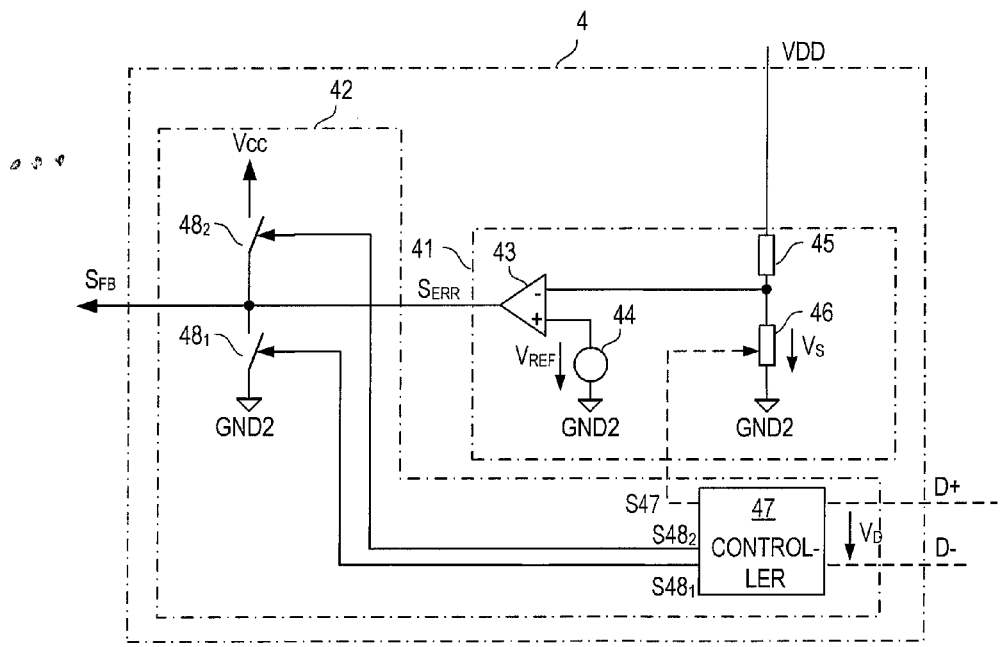
FIG. 8 shows another example of the secondary side control circuit according to embodiments herein.

FIG. 8 shows a secondary side control circuit 4 according to another example. In this example, the modulation circuit 42 includes a second electronic switch $48_2$ coupled between the output of the error signal generator 41 and a supply node where a supply potential Vcc is available. The controller 47 is configured to control the first switch $48_1$ by a first drive signal $S48_1$ and the second switch $48_2$ by a second drive signal $S48_2$. The secondary side control circuit 4 shown in FIG. 8 is configured to modulate the error signal $S_{ERR}$ in accordance to one of the modulation methods explained with reference to FIGS. 2A and 2B. In order to modulate the error signal $S_{ERR}$ in accordance with the method shown in FIG. 2A, the controller 47 switches off the second switch $48_2$ and switches on the first switch $48_1$ in the communication period $T_{COM}$ in accordance with a predefined switching pattern. Each time the first switch $48_1$ is switched on, one of the low pulses in the feedback signal $S_{FB}$ occurs, whereas the feedback signal $S_{FB}$ has a signal level defined by the error signal $S_{ERR}$ when both switches $48_1$, $48_2$ are switched off. In order to modulate the error signal $S_{ERR}$ in accordance with the method shown in FIG. 2B, the controller 47 switches off the first switch $48_1$ (keeps the first switch $48_1$ in the off-state) and switches on the second switch $48_2$, in the communication window $T_{COM}$, in accordance with a predefined switching pattern. Each time the second switch $48_2$ is switched on, one of the high pulses of the feedback signal $S_{FB}$ occurs.

Figure 9:
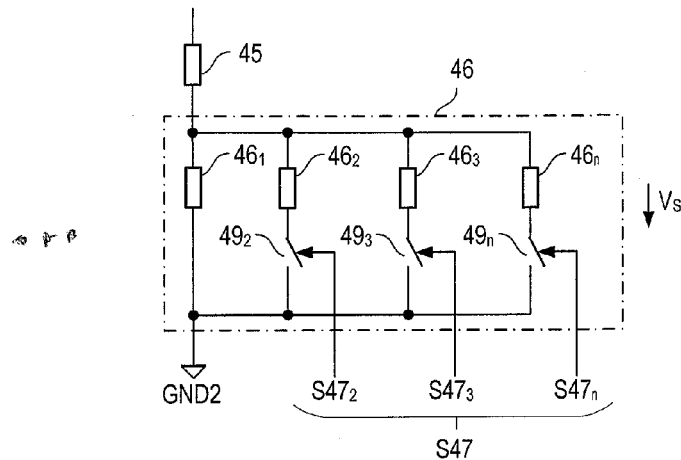
FIG. 9 shows one example of a variable resistor in the secondary side control circuit shown in FIG. 7 according to embodiments herein.

FIG. 9 shows one example of a variable second resistor 46. In this example, the resistor 46 includes several discrete resistors $46_1$, $46_2$, $46_3$, $46_n$. These resistors form a parallel circuit whereas at least some of these discrete resistors $46_2$, $46_3$, $46_n$ can be activated or deactivated. For this, switches $49_2$, $49_3$, $49_n$ are connected in series with three of these discrete resistors, namely resistors $46_2$, $46_3$, $46_n$. The overall resistance of resistor 46 is dependent on which of the discrete resistors $46_1$-$46_n$ is activated or deactivated. In this example, resistor $46_1$ is always activated. However, this is only an example. According to another example (not shown) a switch is also connected in series with this resistor $46_1$. The switches $49_2$-$49_n$ are each controlled by one sub-signal $S47_2$, $S47_3$, $S47_n$ of the control signal S47 output by the controller 47 to control the resistance of the resistor 46. The controller 47 may be configured to vary the activation states of the individual discrete resistors dependent on the voltage information $V_D$ received at the input D+, D− in order to vary the resistance R46 based on this voltage information $V_D$.

Figure 10:
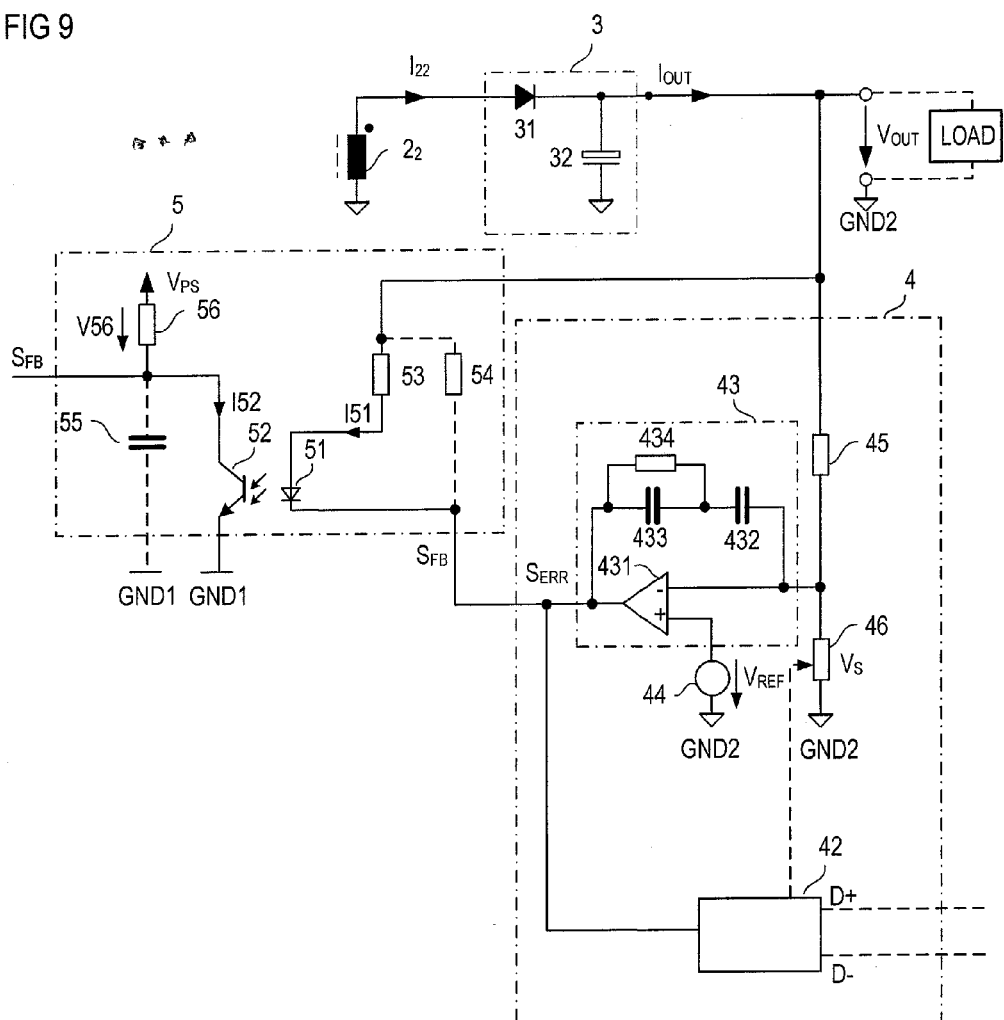
FIG. 10 shows one example of an error signal filter according to embodiments herein.

FIG. 10 shows one example of the transmission circuit and one example of the error filter 43 in greater detail. The error filter 43 includes an operational amplifier (OA) 431 with a first input node that receives the reference voltage $V_{REF}$ and a second input node that receives the sense voltage $V_S$. In the example shown in FIG. 10, the first input node is the non-inverting input and the second input node is the inverting input of the OA 431 The error signal $S_{ERR}$ is available at an output node of the OA 431. According to one example, the error signal $S_{ERR}$ is a voltage referenced to the secondary side ground GND2. A characteristic of the error filter 43 is defined by a passive network connected between the second input node and the output node of the OA 436. The error filter 43 shown in FIG. 10 has a PI characteristic by having a passive network with a first capacitor 432 and a parallel circuit with a second capacitor 433 and a resistor 434 connected between the second input node and the output node. In this passive network, the parallel circuit 433, 434 is connected in series with the first capacitor.

According to one example, the OA 431 and the reference voltage source 44 are implemented as one integrated circuit. For example, the OA 431 and the reference voltage source 44 are included in a TL431 integrated circuit available from Fairchild Semiconductor Corporation.

In the example shown in FIG. 10, the transmission circuit 5 includes an optocoupler with a light emitting diode LED 51 and a phototransistor 52. The LED 51 and the phototransistor are optically coupled such that an intensity of light emitted by the LED 51 defines a current level of a current I52 through the phototransistor 52. The intensity of the light emitted by the LED 51 is defined by a current I51 flowing through the LED. The LED 51 is connected between the output of the error filter 43 and a circuit node where a supply voltage is available. This circuit node is the output of the power converter in this example. Referring to FIG. 10, a first resistor 53 can be connected in series with the LED 51, a second resistor 54 connected in parallel with a series circuit including the LED 51 and the first resistor 53 is optional. On the primary side, a third resistor 56 is connected between the phototransistor 52 and a circuit node where a primary side reference supply voltage $V_{PS}$ is available. The third resistor 56 may also be referred to as feedback resistor $R_{FB}$, as this resistor 56 together with the primary side reference supply voltage $V_{PS}$ generates the primary side feedback signal $S_{FB}$ based on the current I52. Optionally, a capacitor 55 is connected in parallel with the phototransistor 52. Such capacitor serves to filter voltage spikes and stabilize the primary side feedback signal $S_{FB}$.

One way of operation of the transmission circuit shown in FIG. 10 is explained below. In this transmission circuit, a current level of the current I51 through the LED 51 is dependent on the secondary side feedback signal $S_{FB}$, which is the error signal $S_{ERR}$ modulated by the modulation circuit 42. The secondary side feedback signal is a voltage referenced to secondary side ground GND2. When the signal level of this secondary side feedback signal decreases, a voltage across the LED 51 increases so that the current I51 increases. An increasing signal level of the current I51 through the LED 51 causes the intensity of the light emitted by the LED 51 to increase so that a current level of the current I52 through the phototransistor also increases. Thus, the optocoupler acts as a current mirror in which the current I52 flowing through the phototransistor on the primary side is defined by the current flowing through the LED 51 on the secondary side. An increasing current level of this current I52 increases a voltage level of a voltage V56 across the resistor 56 and, consequently, decreases a voltage level of a voltage across the phototransistor 52, wherein this voltage across the phototransistor 52 forms the primary side feedback signal $S_{FB}$. Thus, if the signal level of the secondary side feedback signal $S_{FB}$ decreases the signal level of the primary side feedback signal $S_{FB}$ decreases. Equivalently, if the signal level of the secondary side feedback signal increases the signal level of the primary side feedback signal $S_{FB}$ increases. Therefore, the transmission circuit 5 by transmitting the feedback signal from the secondary side to the primary side does not change the characteristic of the feedback signal $S_{FB}$ generated by the error filter 43 and the modulation circuit 42.

Figure 11:
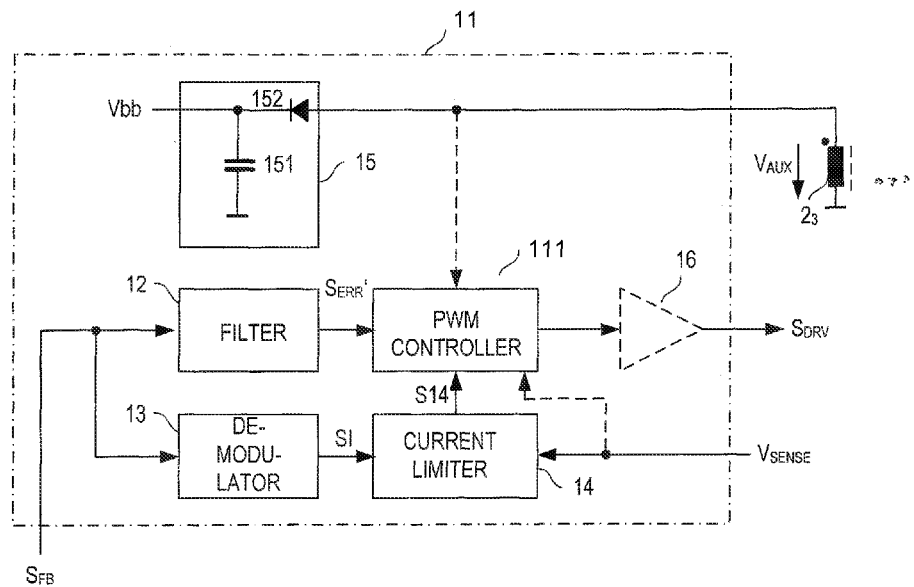
FIG. 11 shows one example of a primary side control circuit according to embodiments herein.

FIG. 11 shows one example of the primary side control circuit 11 in greater detail. FIG. 11 shows a block diagram of the primary side control circuit 11. This block diagram serves to illustrate the functionality of the primary side control circuit 11 rather than its implementation. The individual function blocks can be implemented using a conventional technology suitable to implement a primary side control circuit in a power converter. For example, in order to implement the functionality of the primary side control circuit 11, the function blocks can be implemented as analog circuits, digital circuits or using hardware and software such as a microcontroller on which a specific software is running.

Referring to FIG. 11, the primary side control circuit 11 includes a filter 12 configured to retrieve the error signal $S_{ERR}$ from the feedback signal $S_{FB}$. According to one example, the filter 12 includes a low pass filter configured to filter out the low pulses or the high pulses introduced by the modulation circuit 42 in the secondary side control circuit 4. $S_{ERR}'$ denotes the retrieved error signal in FIG. 11. A PWM controller 111 receives the retrieved error signal $S_{ERR}'$ and generates the PWM drive signal $S_{DRV}$ based on the retrieved error signal $S_{ERR}'$. Optionally, the PWM controller 111 receives an auxiliary voltage $V_{AUX}$ from the auxiliary winding 23 in order to operate the power converter in the quasi-resonant mode explained above. According to another option, the PWM controller 111 further receives the sense signal $V_{SENSE}$ in order to operate the power converter in the current mode, as explained with FIG. 6B. Optionally, the primary side control circuit 11 includes a drive circuit 16 configured to receive an output signal from the PWM controller 111 and to generate the drive signal $S_{DRV}$ based on this output signal from the PWM controller 111.

The primary side control circuit 11 further includes a demodulator 13 that receives the feedback signal $S_{FB}$ and is configured to retrieve the supplemental information included in the communication period $T_{COM}$ of the feedback signal $S_{FB}$. As explained with reference to FIGS. 7 and 8, this supplemental information may include an information on the desired output voltage level of the power converter. In the example shown in FIG. 11, the supplemental information SI retrieved by the demodulator is provided to a current limiter 14. The current limiter 14 receives the sense signal $V_{SENSE}$ and the supplemental information SI and is configured to switch off the electronic switch 12 when the primary current $I_{21}$ as represented by the sense signal $V_{SENSE}$ reaches a predefined current limit, whereas this current limit is defined by the supplemental information SI. In other words, the maximum current level of the primary current I21 is dependent on the output voltage level defined by the load Z, whereas the maximum current increases as the output voltage level increases.

In the example shown in FIG. 11, the current limiter 14 is in communication with the PWM controller 111. In this example, the PWM controller 111 sets the signal level of the drive signal $S_{DRV}$ to an off-level when a signal S14 received from the current limiter 14 indicates that the primary current I21 has reached the predefined current limit. However, this is only an example. According to another example (not shown) the current limiter 14 can be configured to deactivate the driver 16, in order to switch off the electronic switch 12, when the primary current I21 reaches the predefined current limit.

When the secondary side control circuit 4 receives a request by the load Z to change the output voltage level it may at the same time transmit a supplemental information to the primary side control circuit 11 requesting the primary side control circuit 11 to change the current limit and change the resistor R46, whereas such change of the resistor R46 causes the output voltage level to change.

Referring to FIG. 11, the primary side control circuit 11 may include a voltage supply circuit 15 coupled to the auxiliary winding 23. This supply circuit 15 receives the auxiliary voltage $V_{AUX}$ and generates a supply voltage $V_{BB}$ based on this auxiliary voltage $V_{AUX}$. The individual circuit blocks of the primary side control circuit 11 receive the supply voltage $V_{BB}$ from the supply circuit 15. According to one example, the supply circuit 15 includes a rectifier 152 and a capacitor 151. The rectifier 152 such as a diode and the capacitor 151 are connected in series whereas the series circuit is connected in parallel with the auxiliary winding 23. The supply voltage $V_{BB}$ is available across the capacitor 151.

Figure 12:
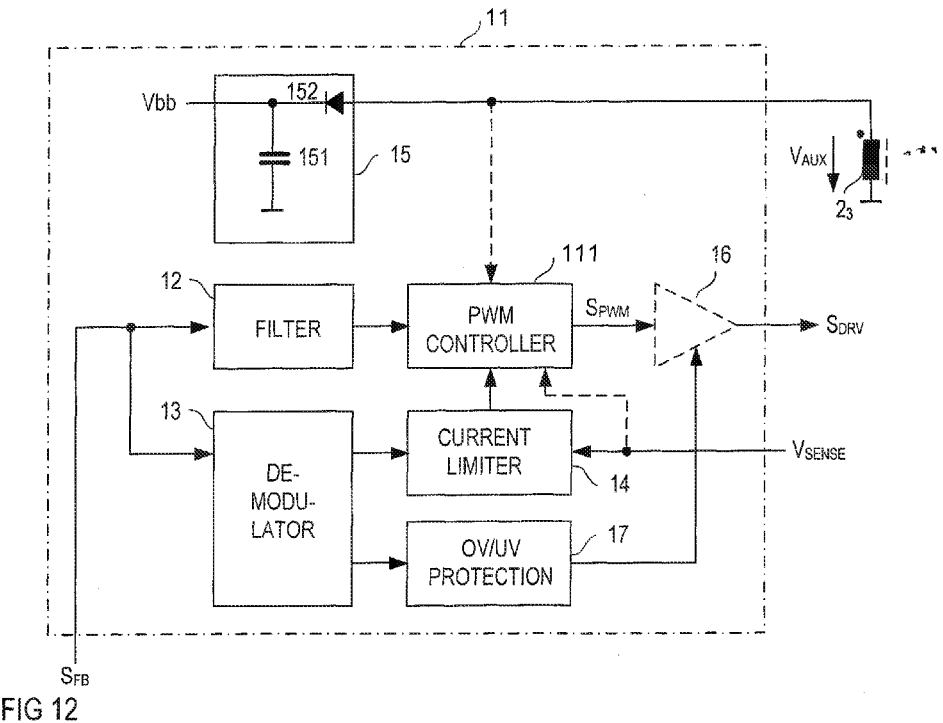
FIG. 12 shows another example of the primary side control circuit according to embodiments herein.

According to one example (shown in dashed lines in FIG. 7), the controller 47 in the primary side control circuit 4 also receives the output voltage $V_{OUT}$ or a signal indicating the output voltage $V_{OUT}$, such as the sense signal $V_S$, and is configured to compare the output voltage $V_{OUT}$ or the signal indicating the output voltage $V_{OUT}$ with at least one of an overvoltage threshold and an undervoltage threshold. In this case, the controller 47 is configured, by sending a supplemental information to the primary side control circuit 11, to inform the primary side control circuit 11 each time the output voltage $V_{OUT}$ rises above the over voltage threshold or falls below the under voltage threshold. Referring to FIG. 12, the primary side control circuit 11 may include a protection circuit 17 that receives from the demodulator 13 the supplemental information indicating that the output voltage $V_{OUT}$ has left the voltage range defined by the overvoltage and the undervoltage. This protection circuit 17 is configured to deactivate the electronic switch 12 when such over voltage or under voltage state has been detected. Deactivating the electronic switch 12 may include deactivating the drive circuit 16. However, this is only an example. According to another example, deactivating the electronic switch 12 includes deactivating the supply circuit 15. If the supply circuit 15 is deactivated, the individual circuit blocks are deactivated and the electronic switch 12 cannot be switch on.

Referring to the above, the feedback signals $S_{FB}$ can be generated such that a signal level of the feedback signal $S_{FB}$ increases as the voltage level of the output voltage $V_{OUT}$ decreases and a signal level of the feedback signal $S_{FB}$ decreases as the voltage level of the output voltage $V_{OUT}$ increases. Thus, when the voltage level of the output voltage $V_{OUT}$ increases towards the overvoltage threshold the signal level of the feedback signal $S_{FB}$ decreases so that the feedback signal $S_{FB}$ may already have a low level when the output voltage reaches the overvoltage threshold. According to one example, the modulation circuit 42 is configured to use a method of the type shown in FIG. 2B, where the signal level of the feedback signal is pulled high in accordance with a predefined pattern, to communicate to the primary side control circuit 11 that the output voltage $V_{OUT}$ has reached the overvoltage threshold. When the voltage level of the output voltage $V_{OUT}$ decreases towards the undervoltage threshold the signal level of the feedback signal $S_{FB}$ increases so that the feedback signal $S_{FB}$ may already have a high level when the output voltage reaches the undervoltage threshold. According to one example, the modulation circuit 42 is configured to use a method of the type shown in FIG. 2A, where the signal level of the feedback signal is pulled down in accordance with a predefined pattern, to communicate to the primary side control circuit 11 that the output voltage $V_{OUT}$ has reached the undervoltage threshold.

Note again that techniques herein are well suited to support conversion of an input voltage into an output voltage via use of a transformer and corresponding circuitry as discussed herein. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, apparatus, etc., that would be known by one of ordinary skill have not been described in detail so as not to obscure claimed subject matter. Some portions of the detailed description have been presented in terms of algorithms or symbolic representations of operations on data bits or binary digital signals stored within a computing apparatus memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

PERMUTATIONS OF FURTHER EMBODIMENTS

Clause 1. A voltage converter, comprising:
an input voltage node;
an output voltage node;
a transformer, the transformer including a primary winding and a secondary winding;
a primary side circuit, the primary side circuit including switch circuitry to control current received from the input voltage node through the primary winding; and
a secondary side control circuit operable to produce an output voltage at the output voltage node, the secondary side control circuit operable to modulate an error signal associated with the output voltage based on received supplemental data to produce a feedback signal encoded to include the error signal and the supplemental data, the secondary side control circuit communicating the feedback signal to the primary side circuit.

Clause 2. The voltage converter of clause 1 further comprising:
a rectifier circuit coupled between the secondary winding and the output voltage node.

Clause 3. The voltage converter of clause 1, wherein the secondary side control circuit is operable to generate the error signal based on a signal proportional to an output signal and a reference signal of the secondary side control circuit, the secondary side control circuit further operable to adjust a proportionality factor between the output signal and the signal proportional to the output signal dependent on the supplemental data.

Clause 4. The voltage converter of clause 3, wherein the secondary side control circuit comprises a voltage divider to output the signal proportional to the output signal, and
wherein the secondary side control circuit is operable to adjust the proportionality factor via adjusting a voltage divider ratio of the voltage divider.

Clause 5. The voltage converter of clause 1, wherein the secondary side circuit is further operable to generate the supplemental data based on an output signal outputted from the output voltage node.

Clause 6. The voltage converter of clause 5, wherein the secondary side control circuit is operable to generate the supplemental data in response to detecting that a magnitude of the output signal is outside a predefined signal range.

Clause 7. The voltage converter of clause 1, wherein the primary side circuit further comprises:
a primary side control circuit operable to: receive the feedback signal, obtain the error signal and the supplemental data from the received feedback signal, and control the switch circuitry based on the obtained error signal.

Clause 8. The voltage converter of clause 7, wherein the primary side control circuit is operable to: i) limit a magnitude of the current through the primary winding to less than a predefined current level, and ii) set the predefined current level based on the obtained supplemental data obtained from the feedback signal.

Clause 9. The voltage converter of clause 7, wherein the primary side control circuit is operable to conditionally shut down the voltage converter depending on a state of the supplemental data obtained from the feedback signal.

Clause 10. The voltage converter of clause 1, wherein the secondary side control circuit modulates the error signal in a communication time period, the modulation including adjusting a magnitude of the error signal in accordance with a predefined pattern to convey the supplemental data in the feedback signal.

Clause 11. The voltage converter of clause 1, wherein the secondary side circuit is operable to produce the error signal based on an output voltage outputted from the output voltage node.

Clause 12. A method comprising:
via a secondary side circuit in a voltage converter:
receiving an error signal generated based on an output signal of the voltage converter;
receiving supplemental data to convey to a primary side circuit of the voltage converter;
modulating the error signal based on the supplemental data, the modulated error signal encoded to include the supplemental data;
transmitting the modulated error signal as a feedback signal to the primary side circuit, the primary side circuit operable to use the feedback signal to control current through a primary winding of a transformer in the voltage converter.

Clause 13. The method of clause 12, further comprising:
generating the output signal via a rectifier circuit coupled between a secondary winding of the transformer and an output node of the voltage converter.

Clause 14. The method of clause 12, wherein generating the error signal comprises generating the error signal based on a signal proportional to the output signal and a corrg reference signal, and adjusting a proportionality factor between the output signal and the signal proportional to the output signal dependent on the supplemental data.

Clause 15. The method of clause 14, further comprising:
outputting the signal proportional to the output signal using a voltage divider; and
wherein adjusting the proportionality factor comprises adjusting a voltage divider ratio of the voltage divider.

Clause 16. The method of clause 12, further comprising:
generating the supplemental data based on a state of the output signal.

Clause 17. The method of clause 16 further comprising:
producing the supplemental data to indicate that a magnitude of the output signal is outside a predefined signal range.

Clause 18. The method of clause 12 further comprising:
via the primary side circuit:
receiving the feedback signal;
obtaining the error signal and the supplemental data from the received feedback signal; and
controlling switch circuitry in the primary side circuit using the received error signal.

Clause 19. The method of clause 18, further comprising:
via the primary side circuit:
setting a predefined current level based on the supplemental data obtained from the feedback signal; and
limiting a magnitude of the current through the primary winding to less than the predefined current level.

Clause 20. The method of clause 18, further comprising:
conditionally shutting down the voltage converter depending on a state of the supplemental data.

Clause 21. The method of clause 12 further comprising:
modulating the error signal in a communication time period, the modulation including adjusting a magnitude of the error signal in accordance with a predefined pattern to encode the feedback signal to include the supplemental data.

The invention claimed is:
1. A voltage converter, comprising: an input voltage node; an output voltage node; a transformer, the transformer including a primary winding and a secondary winding; a primary side circuit, the primary side circuit including switch circuitry to control current received from the input voltage node through the primary winding, the switch circuitry including a switch; a secondary side control circuit to produce an output voltage at the output voltage node, the secondary side control circuit operable to modulate an error signal associated with the output voltage based on received supplemental data to produce a feedback signal encoded to include the error signal and the supplemental data, the secondary side control circuit communicating the feedback signal to the primary side circuit; wherein the secondary side control circuit is operable to generate the error signal based on a signal proportional to the output voltage and a reference signal of the secondary side control circuit; wherein the secondary side control circuit is further operable to adjust a proportionality factor between the output voltage and the signal proportional to the output voltage dependent on the supplemental data; and, wherein the primary side circuit further comprises a primary side control circuit operable to: receive the feedback signal, obtain the error signal and the supplemental data from the received feedback signal, adjust a current limit of the current through the primary winding based on the supplemental data, and control the switch circuitry based on the obtained error signal and the current limit.

2. The voltage converter of claim 1 further comprising: a rectifier circuit coupled between the secondary winding and the output voltage node.

3. The voltage converter of claim 1, wherein the secondary side control circuit comprises a voltage divider to output the signal proportional to the output voltage, signal, and wherein the secondary side control circuit is operable to adjust the proportionality factor via adjusting a voltage divider ratio of the voltage divider.

4. The voltage converter of claim 1, wherein the secondary side circuit is further operable to generate the supplemental data based on an output signal outputted from the output voltage node.

5. The voltage converter of claim 4, wherein the secondary side control circuit is operable to generate the supplemental data in response to detecting that a magnitude of the output voltage signal is outside a predefined signal range.

6. The voltage converter of claim 1, wherein the primary side control circuit is operable to conditionally shut down the voltage converter depending on a state of the supplemental data obtained from the feedback signal.

7. The voltage converter of claim 1, wherein the secondary side control circuit modulates the error signal in a communication time period, the modulation including adjusting a magnitude of the error signal in accordance with a predefined pattern to convey the supplemental data in the feedback signal.

8. The voltage converter of claim 1, wherein the secondary side circuit is operable to produce the error signal based on the an output voltage outputted from the output voltage node.

9. A method comprising: by a secondary side circuit in a voltage converter: generating an error signal based on a signal proportional to an output voltage of the voltage converter and a reference signal such that a proportionality factor between the output voltage and the signal proportional to the output voltage is dependent on supplemental data received by the secondary side circuit; modulating the error signal based on the supplemental data; transmitting the modulated error signal encoded with the supplemental data as a feedback signal to the primary side circuit; and by the primary side circuit: receiving the feedback signal, obtaining the error signal and the supplemental data from the received feedback signal, adjusting a current limit of a current through a primary winding of a transformer in the voltage converter based on the supplemental data, and controlling the current through the primary winding based on the obtained error signal and the current limit.

10. The method of claim 9, further comprising: generating the output voltage via a rectifier circuit coupled between a secondary winding of the transformer and an output node of the voltage converter.

11. The method of claim 9, further comprising: outputting the signal proportional to the output voltage signal using a voltage divider; and wherein adjusting the proportionality factor comprises adjusting a voltage divider ratio of the voltage divider.

12. The method of claim 9, further comprising: generating the supplemental data based on a state of the output voltage.

13. The method of claim 12 further comprising: producing the supplemental data to indicate that a magnitude of the output voltage is outside a predefined range.

14. The method of claim 9 further comprising: conditionally shutting down a the voltage converter that generates the output voltage depending on a state of the supplemental data.

15. The method of claim 9 further comprising: modulating the error signal in a communication time period, the modulation including adjusting a magnitude of the error signal in accordance with a predefined pattern to encode the feedback signal to include the supplemental data.

* * * * *